United States Patent
Connor

(10) Patent No.: US 7,474,616 B2
(45) Date of Patent: Jan. 6, 2009

(54) CONGESTION INDICATION FOR FLOW CONTROL

(75) Inventor: Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 966 days.

(21) Appl. No.: 10/078,772

(22) Filed: Feb. 19, 2002

(65) Prior Publication Data

US 2003/0156542 A1  Aug. 21, 2003

(51) Int. Cl.
G08C 15/00  (2006.01)
(52) U.S. Cl. ............ 370/230.1; 370/235; 370/468
(58) Field of Classification Search ............ 370/229, 370/230, 230.1, 232, 235–237, 395.41, 414, 370/418, 468
See application file for complete search history.

(56) References Cited

U.S. PATENT DOCUMENTS

| 5,719,853 | A  * | 2/1998  | Ikeda | 370/229 |
| 6,667,985 | B1 * | 12/2003 | Drummond-Murray | 370/415 |
| 6,754,179 | B1 * | 6/2004  | Lin | 370/235 |
| 6,771,601 | B1 * | 8/2004  | Aydemir et al. | 370/231 |
| 6,816,465 | B1 * | 11/2004 | Barsoum et al. | 370/252 |
| 6,980,520 | B1 * | 12/2005 | Erimli | 370/236 |
| 7,002,911 | B1 * | 2/2006  | Linville et al. | 370/230 |
| 7,027,401 | B1 * | 4/2006  | Ozegovic | 370/236 |
| 7,061,868 | B1 * | 6/2006  | Ahlfors et al. | 370/236 |

OTHER PUBLICATIONS

"Layer 2, 3, and 4 Switches Moving data efficiently and quickly", *Black Box Network Services*; http://www.blackbox.com/tech_docs/tech_overviews/switching-overview.html, Copyright 2000 Black Box Corporation, 2 pgs., (Feb. 1, 2001).
"OSI Seven-Layer Model", *Connected: An Internet Encyclopedia*; http://www.freesoft.org/CIE/Topics/15.htm, 2 pgs., (Dec. 27, 2001).
Banttari, D., "The Bottom of the OSI Model", *Daryl's TCP/IP Primer*; http://www.ipprimer.com/osi.cfm, Copyright 1996-2001 Daryl Banttari, 2 pgs., (Dec. 27, 2001).
Braden, R. , "Requirements for Internet Hosts—Communication Layers", *Internet Engineering Task Force*, (Oct. 1989),1-109.
Ramakrishnan, K. , et al., "The Addition of Explicit Congestion Notification (ECN) to IP Status of this Memo", *The Internet Society*, (Sep. 2001),1-57.

* cited by examiner

Primary Examiner—Chi H Pham
Assistant Examiner—Donald L Mills
(74) Attorney, Agent, or Firm—Robert A. Greenberg

(57) ABSTRACT

A method, apparatus, and signal-bearing medium for indicating and responding to congestion in a network. When a buffer at a receiver is nearly full, the receiver may send a congestion indication to the sender(s) that is causing the congestion. When the receiver(s) receives the congestion indication, it may implement a flow-control technique to temporarily lower the rate that it is sending the frames to the receiver, and then increase the rate.

6 Claims, 5 Drawing Sheets

CONGESTION INDICATION FOR FLOW CONTROL

FIELD

An embodiment of the invention relates generally to a network and more particularly to a congestion indication for flow control in the network.

BACKGROUND

Computer networks are becoming pervasive because people wish to send, receive, and share information. At a simple level, a network can be thought of as end-points, which might be computers or other electronic devices, connected via infrastructure (e.g., transmission links and switches). The end-points, transmission links, and switches may have different capabilities. For example, one end-point might be a mainframe computer while another end-point might be a pocket computer, and one link might be a telephone line while another link might be a dedicated high-speed cable. Because networks can have such disparate end-points and links, networks typically use a technique called "flow control" to control the flow of data in an attempt to increase performance. Three types of flow control are discussed below.

Ethernet Flow Control

Ethernet offers a method of flow control based on a receive-buffer fullness threshold. This Ethernet flow-control standard is covered in the IEEE 802.3x specification. It is intended to reduce buffer overruns, which result in frame loss. Frame loss reduces network reliability and available bandwidth and hurts performance.

In Ethernet flow control, as a receiving end-point receives frames, they are placed into a buffer. The frames are processed, and the buffer space they used is then available for subsequent frames. If the rate of incoming frames exceeds the rate at which the receiver can process them, the buffer begins to fill up. When a fullness threshold is exceeded, the receiver sends a pause frame to its link-partner, e.g. a switch. A pause frame causes the switch to stop sending frames. This allows the receiver time to process the already-received frames and prevents the receiver's buffer from overflowing with subsequent frames.

Ethernet flow control works well from the perspective of the receiver. But, this only moves the problem from the receiver to the switch. Pause frames are not sent to the source of the frames (the sender); they are only sent from link-partner to link-partner (e.g. the receiving end-point to the switch). If the switch were to propagate the pause frame, then this could unnecessarily slow communications across the network. So, pause frames are not propagated, and the sender that is causing congestion is not informed that the receiver is nearly full. This means that the switch is receiving frames, but it is not allowed to forward them. This results in the switch dropping frames when its buffer size is exceeded. Thus, the primary drawback to Ethernet flow control is that it is not connection oriented. Instead it is a point-to-point (link-partner to link-partner) protocol that has no concept of an end-to-end (sender-to-receiver) connection.

TCP Flow Control

TCP (Transmission Control Protocol) has a different flow-control mechanism from the Ethernet. When a connection is initially established, TCP sends at a slow data rate to assess the bandwidth of the connection and to avoid overflowing the receiver or any other infrastructure in the network path, such as routers or switches that the frames must traverse to get from the sender to the receiver. The send window starts at a small size. As TCP/IP segments are acknowledged, the send window is increased until the amount of data being sent per burst reaches the size of the receiver's window. At that point, the slow-start algorithm is no longer used and the receiver's window governs TCP flow control. But, at any time during transmission, congestion can still occur on a connection. If this happens (evidenced by missing acknowledgments and the need to retransmit), a congestion-avoidance algorithm is used to reduce the send-window size temporarily, and then to slowly increment the send window back towards the receiver's window size.

The primary disadvantage to the TCP flow-control algorithm is that it is reactive instead of proactive. That is, frames must be dropped before TCP at the sender realizes that there is a congestion issue. Because TCP detects dropped frames by waiting for acknowledgments to time out, multiple round-trip time delays may occur before TCP realizes that a frame has been dropped. Also, TCP's congestion control has no visibility to the buffer-fullness state, which is a primary reason for frame loss.

Combining Ethernet Flow Control with TCP Flow Control

TCP flow control is connection oriented and reactive while Ethernet is point-to-point oriented and proactive. Based on these factors alone, it might seem that a network running TCP with Ethernet flow control would reap the benefits of both. Unfortunately, the opposite is true.

Using a combined Ethernet/TCP flow-control technique, as a buffer in a receiver approaches fullness, the receiver sends a pause frame to the switch. The switch then begins to buffer frames destined for the receiver, so congestion has occurred, but no frames have yet been dropped. The switch will send the buffered frames to the receiver as soon as a pause timer, started by the pause frame, expires. The delay in forwarding due to pause frames is significantly smaller than the acknowledgment time-out of TCP. Because TCP at the sender depends on dropped frames to detect congestion, and these buffered frames were not dropped, TCP cannot detect that congestion has occurred. Thus, Ethernet flow control delays frame droppage, which allows TCP flow control to continue to receive acknowledgments, even for frames that were involved in congestion. Based on these acknowledgments, TCP flow control may even increase the data rate on the connection. This only exacerbates the congestion problem, resulting in a greater number of frames that are dropped at the switch and therefore a greater number of frames that will need to be retransmitted.

Conclusion

Both Ethernet and TCP flow control have significant limitations. Ethernet flow control is not connection oriented and only moves the problem from the receiver to the infrastructure (e.g. the switch). TCP flow control is slow to react and requires frames to be dropped before congestion is detected. Finally, when the two flow-control mechanisms are used together, the combination makes their separate limitations worse.

DETAILED DESCRIPTION

Figure 1:
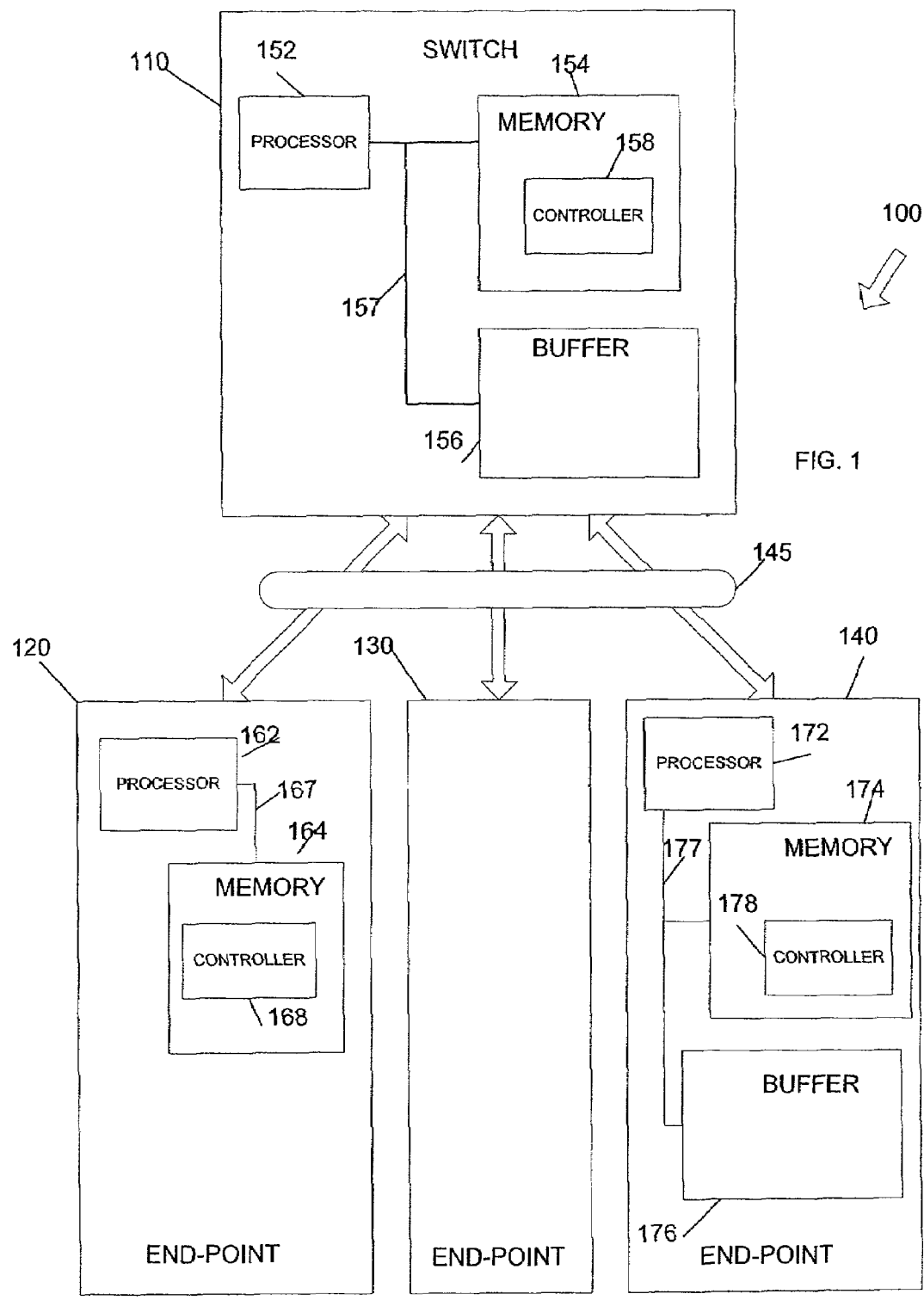
FIG. 1 depicts a block diagram of a system for implementing an embodiment of the invention.

FIG. 1 depicts a system 100 including a switch 110 connected via a network 145 to the end-points 120, 130, and 140 for implementing an embodiment of the invention.

Switch 110 may include a processor 152, a memory 154, and a buffer 156, all connected via a bus 157. In another embodiment, switch 110 may be implemented by a computer, a router, a bridge, an electronic device, or any other suitable hardware and/or software. Although only one switch 110 is shown, in other embodiments multiple switches may be present.

The processor 152 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 152 may execute instructions and may include that portion of the switch 110 that controls the operation of the entire electronic device. Although not depicted in FIG. 1, the processor 152 typically includes a control unit that organizes data and program storage in memory and transfers data and other information between the various parts of the switch 110. The memory 154 may represent one or more mechanisms for storing data. For example, the memory 154 may include read only memory (ROM), random access memory (RAM), magnetic disk storage media, optical storage media, flash memory devices, and/or other machine-readable media. In other embodiments, any appropriate type of storage device may be used. Although only one memory 154 is shown, multiple storage devices and multiple types of storage devices may be present. Further, although the switch 110 is drawn to contain the memory 154, it may be distributed across other electronic devices.

The memory 154 may include a controller 158. The controller 158 may contain instructions that execute on the processor 152. In another embodiment, the controller 158 may be implemented in hardware in lieu of a processor-based system. In an embodiment, the controller 158 is implemented as a MAC (Media Access Controller) that supports the Ethernet protocol. In other embodiments, the controller 158 may be implemented as an Arcnet controller, an ATM (Asynchronous Transfer Mode) controller, a sonic controller, or any other suitable type of controller. The operations of the controller 158 are further described below with reference to FIG. 4. Of course, the memory 154 may also contain additional software and/or data (not shown), which is not necessary to understanding an embodiment of the invention.

The bus 157 may represent one or more busses, e.g., PCI (Peripheral Component Interconnect), ISA (Industry Standard Architecture), X-Bus, EISA (Extended Industry Standard Architecture), or any other appropriate bus.

Although the switch 110 is shown to contain only a single processor 152 and a single bus 157, in another embodiment the switches 110 may have multiple processors and/or multiple buses with some or all performing different functions in different ways.

The end-point 120 may include a processor 162 connected to a memory 164 via a bus 167. The processor 162 may be analogous to the processor 152. The memory 164 may be analogous to the memory 154. The memory 164 may include a controller 168, which may contain instructions for execution on the processor 162. The functions of the controller 168 are further described below with respect to FIG. 5. The bus 167 may be analogous to the bus 157.

The end-point 130 may be analogous to the end-point 120.

The end-point 140 may include a processor 172 connected to a memory 174 and a buffer 176 via a bus 177. The processor 172 may be analogous to the processor 162. The memory 174 may be analogous to the memory 164. The buffer 176 may be analogous to the buffer 156. The memory 174 may include a controller 178, which may contain instructions for execution on the processor 172. The functions of the controller 178 are further described below with respect to FIG. 3. The bus 177 may be analogous to the bus 157.

The network 145 may be any suitable network and may support any appropriate protocol suitable for communication between the switch 110, the end-point 120, the endpoint 130, and the end-point 140. In an embodiment, the network 145 may support wireless communications. In another embodiment, the network 145 may support hard-wired communications, such as a telephone line or cable. In another embodiment, the network 145 may support the Ethernet IEEE 802.3x specification. In another embodiment, the network 145 may support a version of the Ethernet Gigabit IEEE 802.3z specification. In another embodiment, the network 145 may be the Internet and may support IP (Internet Protocol). In another embodiment, the network 145 may be a local area network (LAN) or a wide area network (WAN). In another embodiment, the network 145 may be a hotspot service provider network. In another embodiment, the network 145 may be an intranet. In another embodiment, the network 145 may be a GPRS (General Packet Radio Service) network. In another embodiment, the network 145 may be any appropriate cellular data network or cell-based radio network technology. In another embodiment, the network 145 may be a version of the IEEE (Institute of Electrical and Electronics Engineers) 802.11 wireless network. In another embodiment, the network 190 may be a storage area network. In still another embodiment, the network 145 may be any suitable network or combination of networks. Although one network 145 is shown, in other embodiments any number of networks (of the same or different types) may be present and various end-points may use the same network or different networks.

Although three end-points 120, 130, and 140 are shown in FIG. 1, in other embodiments any number of end-points may be present. Although the end-points 120, 130, and 140 are shown as being separate from the switch 110, some or all of the end-points 120, 130, and 140 may have their own switch and may be packaged together with their respective switch.

The end-points 120, 130, and 140 may be implemented using any suitable hardware and/or software, such as a personal computer other appropriate electronic device. Portable electronic devices, laptop or notebook computers, pagers, telephones, minicomputers, and mainframe computers are examples of other possible configurations of the end-points 120, 130, and 140. The hardware and software depicted in FIG. 1 may vary for specific applications and may include more or fewer elements than those depicted.

As will be described in detail below, aspects of an embodiment pertain to specific apparatus and method elements implementable on an electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium (e.g., read-only memory devices attached to or within an electronic device, such as a CD-ROM readable by a CD-ROM drive);

(2) alterable information stored on a rewriteable storage medium (e.g., a hard disk drive or diskette); or (3) information conveyed to an electronic device by a communications medium, such as through a network 145, including wireless communications.

Such signal-bearing media, when carrying machine-readable instructions that direct the functions of the present invention, represent embodiments of the present invention.

Figure 2:
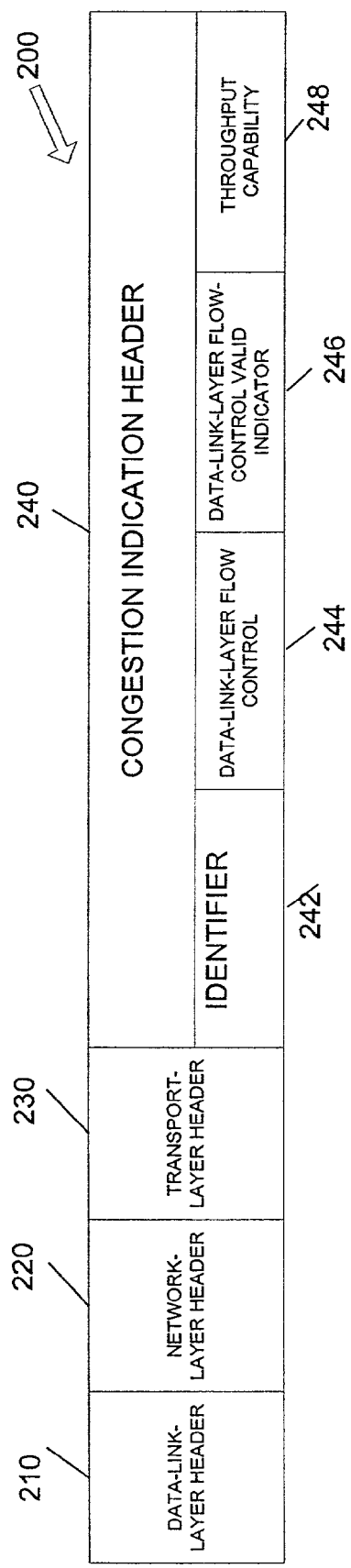
FIG. 2 depicts a block diagram of a congestion-indication data structure, according to an embodiment of the invention.

FIG. 2 depicts a block diagram of a data structure for a congestion-indication frame 200, according to an embodiment of the invention. The congestion-indication frame 200 may be built by the end-point 140 when the buffer 176 exceeds a threshold and may be transmitted to switch 110 and ultimately to the end-point 120, as further described below with reference to FIGS. 3, 4, and 5.

Referring again to FIG. 2, the congestion-indication frame 200 may include a data-link-layer header 210, a network-layer header 220, a transport-layer header 230, and a congestion-indication header 240. "Data-link-layer," "network-layer," and "transport-layer", may correspond to layer 2, layer 3, and layer 4, respectively, in the OSI (Open Systems Interconnection) network model documented in OSI 7498.

The data-link-layer header 210 may include information specific to the data-link-layer protocol used. In an embodiment, the data-link-layer header 210 is an Ethernet II header, but, in other embodiments, a token ring header or any suitable protocol header may be used.

The network-layer header 220 may include information specific to the network-layer protocol used. In an embodiment, the network-layer header 220 may be an IP (Internet Protocol) header, but, in other embodiments, an IPX (Internetwork Packet Exchange) header or any other suitable protocol may be used. In an embodiment, the end-point to receive the congestion-indication frame 200 is specified in the network-layer header 220, but in other embodiments, the end-point to receive the congestion-indication frame 200 may be anywhere within congestion-indication frame 200.

The transport-layer header 230 may include information specific to the transport-layer protocol used. In an embodiment, the transport-layer header 230 is a TCP header, but, in other embodiments, an UDP (User Datagram Protocol) header, a SPX (Sequenced Packet Exchange) header, or any other suitable protocol may be used.

The congestion-indication header 240 may include an identifier 242, a data-link-layer flow-control field 244, a data-link-layer flow-control valid-indicator 246, and a throughput-capability field 248.

The identifier 242 identifies the frame as being a congestion-indication frame.

The data-link-layer flow control field 244 indicates that the sending of frames is to be paused. In an embodiment, the data-link-layer flow control field 244 may include Ethernet 802.3x pause information.

The data-link-layer flow-control valid-indicator 246 indicates whether the data in the data-link-layer flow control field 244 is valid or is to be ignored.

The throughput-capability field 248 contains information that the recipient of the congestion-indication frame 200 (the end-point 120 in this example) may use in its flow control processing. For example, the throughput-capability field 248 may contain the throughput capability or link speed (e.g. frames per second) of the originator of the congestion-indication frame 200 (e.g. the end-point 140 in this example).

Figure 3:
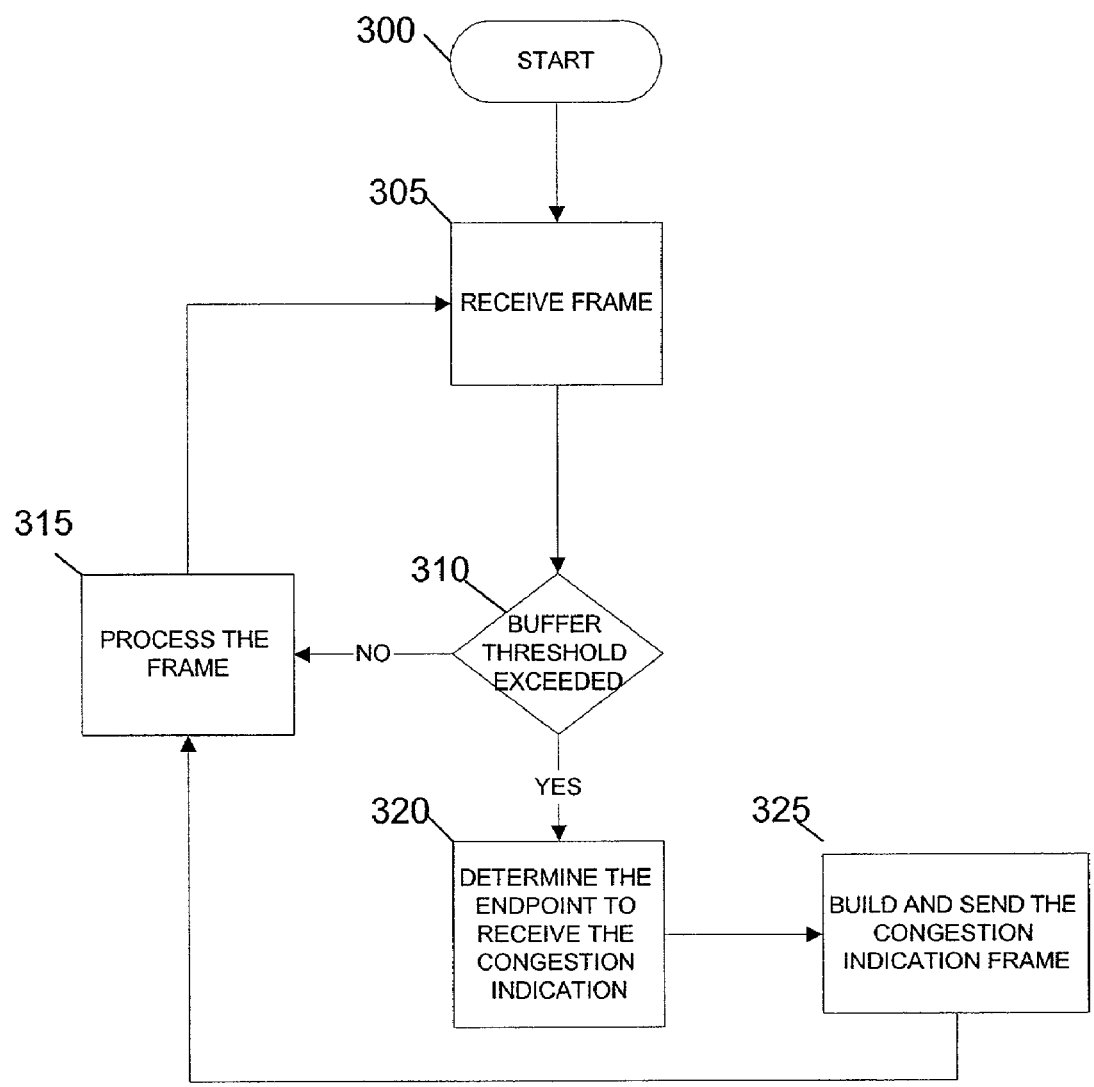
FIG. 3 depicts a flowchart of example processing at a receiving end-point, according to an embodiment of the invention.

FIG. 3 depicts a flowchart of example processing at the receiving end-point 140, according to an embodiment of the invention. Control begins at block 300. Control then continues to block 305 where the controller 178 receives a frame. Control then continues to block 310 where the controller 178 determines whether storing the received frame in the buffer 176 has caused a buffer threshold to be exceeded. In an embodiment, the buffer threshold is based on a percentage of the size of the buffer. In an embodiment, the buffer threshold is predetermined, but in another embodiment the buffer threshold is variable.

If the determination at block 310 is false, then control continues to block 315 where the controller 178 processes the frame. Control then returns to block 305, as previously described above.

If the determination at block 310 is true, then control continues to block 320 where the controller 178 determines an end-point to receive a congestion indication. In an embodiment, the controller 178 determines the end-point to receive the congestion indication based on which end-point sent the most data in the buffer 176. The controller 178 may also use determine the end-point based on a time period in which the data was received. The controller 178 may keep statistics of the amount of data currently in the buffer 176, which end-points are the sources of that data, and the time at which the data was received in order to facilitate this determination. In an embodiment, the controller 178 determines the end-point to receive the congestion indication based on the sender of the most recent frame that caused the buffer threshold to be exceeded. In an embodiment, only sources that have sent data within a most-recent time period are considered, in order to weigh more heavily those sources that are sending the most data the most recently. In an embodiment, the controller 178 determines only one end-point to receive the congestion indication. In another embodiment, the controller 178 determines multiple end-points to receive the congestion indication.

Control then continues to block 325 where the controller 178 builds and sends the congestion-indication frame 200 to a link-partner of the end-point 140. A link-partner is the entity that directly connects to the end-point. In the example of FIG. 1, the link-partner of the end-point 140 is the switch 110. The controller 178 may store the address of the end-point determined in block 320 in the network-layer header 220. The controller 178 may set the identifier 242 to indicate that the frame is a congestion-indication frame, may set the data-link-layer flow-control field 244 to indicate that the sending of frames should be paused. The controller 178 may set the data-link-layer flow-control valid indicator 246 to indicate that the data-link-layer flow-control field 244 is valid. The controller 178 may store in the throughput-capability field 248 the speed at which the end-point 140 is able to receive frames. Control then returns to block 315 as previously described above.

Figure 4:
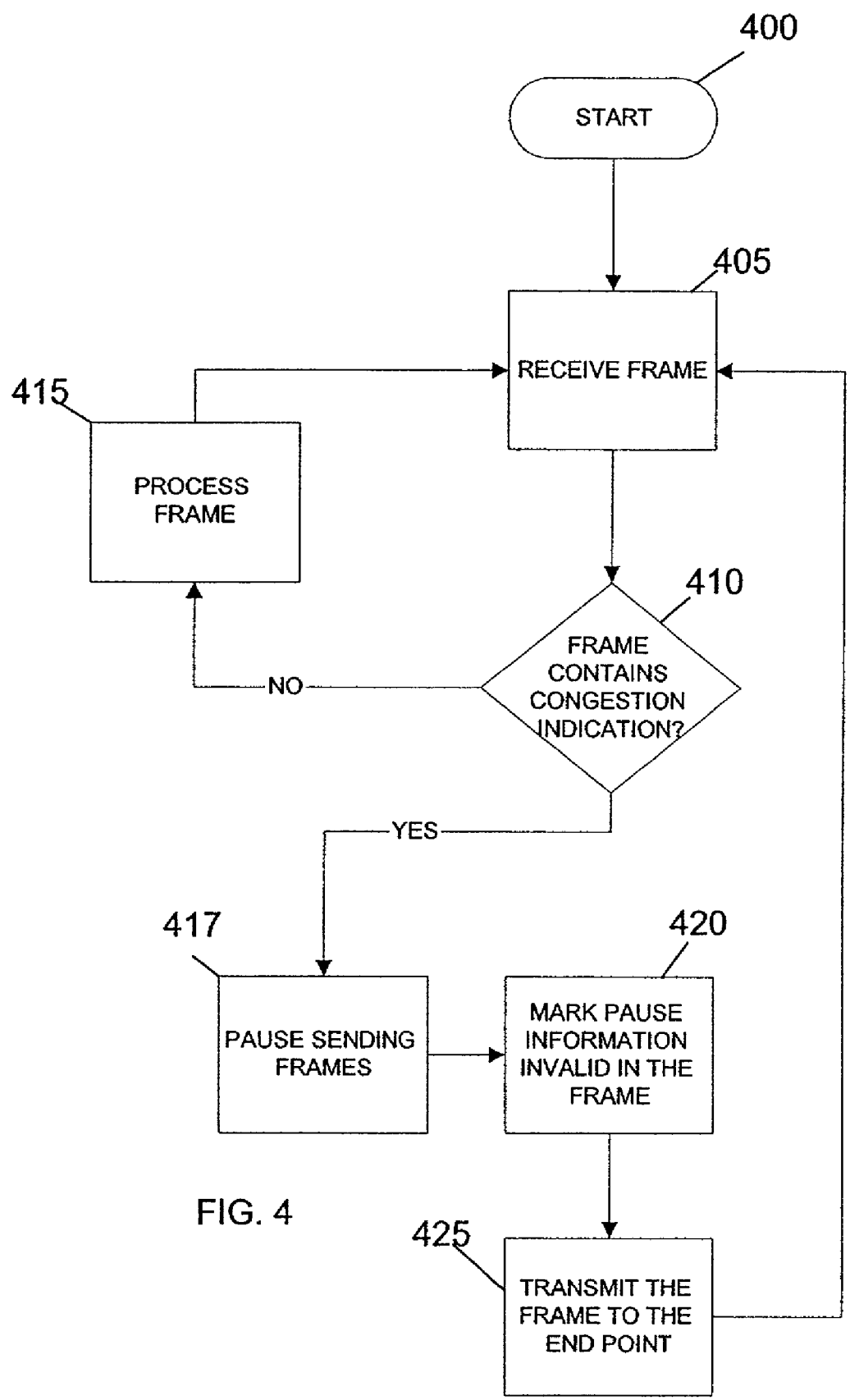
FIG. 4 depicts a flowchart of example processing at a switch, according to an embodiment of the invention.

FIG. 4 depicts a flowchart of example processing at the switch 110, according to an embodiment of the invention. Control begins at block 400. Control then continues to block 405 where the controller 158 receives a frame. Control then continues to block 410 where the controller 158 determines whether the received frame contains a congestion indication in the identifier 242, indicating that the received frame is the congestion-indication frame 200, and that the data-link-layer flow-control field 244 indicates that the sending of frames should be paused.

If the determination at block 410 is false, then control continues to block 415 where the controller 158 processes the frame. Control then returns to block 405, as previously described above.

If the determination at block 410 is true, then control continues to block 417 where the controller 158 momentarily pauses sending frames to the end-point 140, which sent the congestion-indication frame 200. The controller 158 buffers future frames directed to the end-point 140 in the buffer 156 for a period of time, after which the controller 158 will resume sending frames to the end-point 140. Control then continues to block 420 where the controller 158 marks the data-link-layer flow-control valid indicator 246 to indicate that the data-link-layer flow-control field 244 is invalid. Control then continues to block 425 where controller 158 transmits the congestion-indication frame 200 to the end-point specified in the network-layer header 220. Control then returns to block 405 as previously described above.

Figure 5:
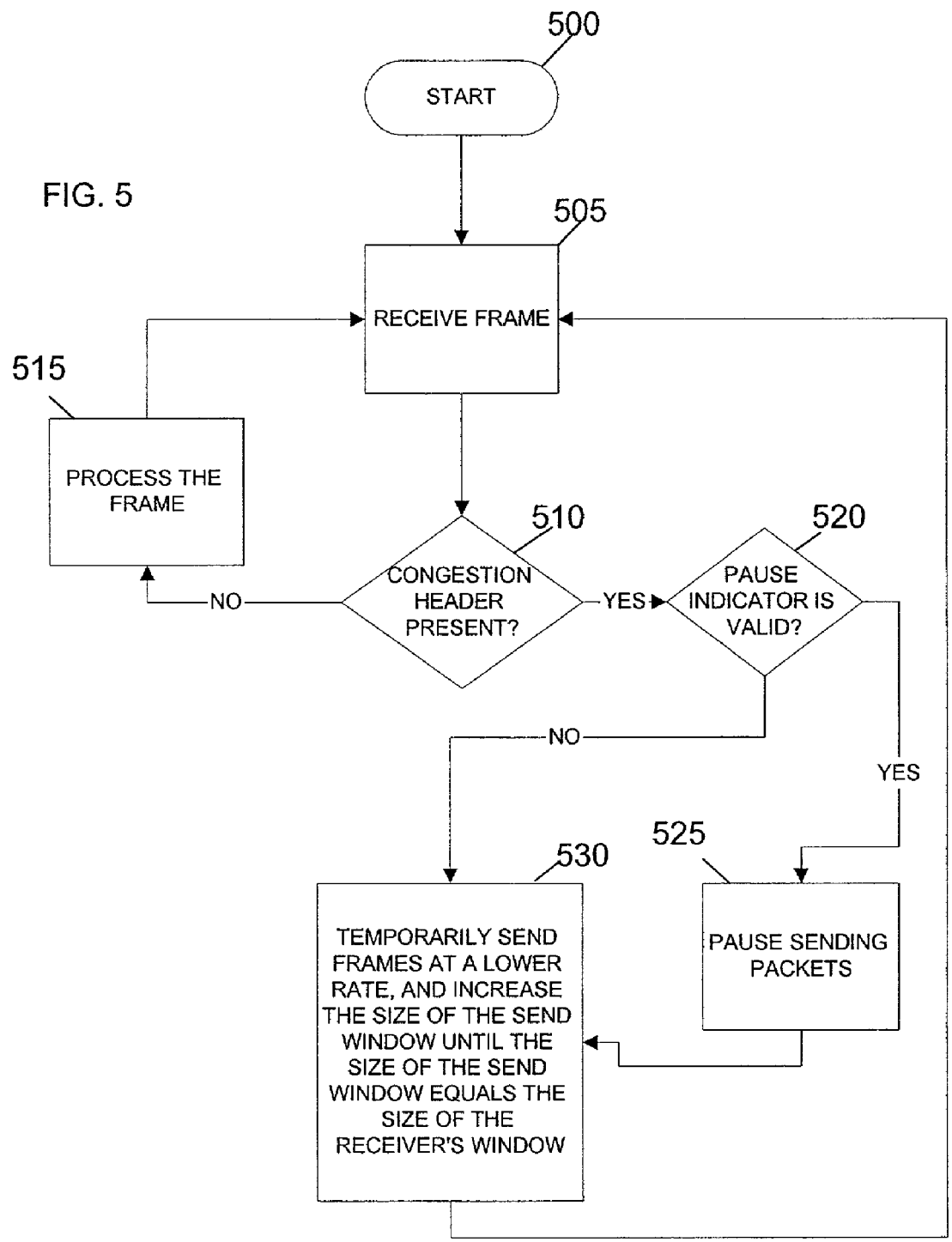
FIG. 5 depicts a flowchart of example processing at a sending end-point, according to an embodiment of the invention.

FIG. 5 depicts a flowchart of example processing at the sending end-point 120, according to an embodiment of the invention. Control begins at block 500. Control then continues to block 505 where the controller 168 receives a frame. Control then continues to block 510 where the controller 168 determines whether the received frame is the congestion-indication frame 200 by checking the identifier 242.

If the determination at block 510 is false, then control continues to block 515 where the controller 168 processes the frame. Control then returns to block 505, as previously described above.

If the determination at block 510 is true, then control continues to block 520 where the controller 168 determines whether the pause indication in the data-link-layer flow control-field 244 is valid by checking the data-link-layer flow-control valid indicator 246. If the determination at block 520 is true, then control continues to block 525 where the controller 168 pauses sending frames that are intended for the end-point 140. Control then continues to block 530 where the controller 168 temporarily sends frames to the end-point 140 at a lower rate, and increases the size of the send window until the size of the send window equals the size of the window at the receiver (the end-point 140). In an embodiment, the controller 168 may base the rate at which it sends frames to the end-point 140 on the information in the throughput-capability field 248. Control then returns to block 505, as previously described above.

If the determination at block 520 is false, then control continues directly to block 530, as previously described above.

In the previous detailed description of exemplary embodiments of the invention, reference was made to the accompanying drawings (where like numbers represent like elements), which form a part hereof, and in which was shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. The previous detailed description is, therefore, not to be taken in a limiting sense, and the scope of an embodiment of the present invention is defined only by the appended claims.

Numerous specific details were set forth to provide a thorough understanding of an embodiment of the invention. However, an embodiment of the invention may be practiced without these specific details. In other instances, well-known circuits, structures and techniques have not been shown in detail in order not to obscure an embodiment of the invention.

What is claimed is:

1. A method comprising:
    at a first node, receiving a frame;
    at a first node, in response to the receiving the frame, determining that a buffer at the first node exceeds a threshold of occupancy;
    at a first node, building a congestion notification frame comprising a value identifying the frame as a congestion notification frame and a data value used by a second node to determine a lower non-zero rate to send at least one frame to the first node;
    at a first node, sending the congestion notification frame toward the second node via at least one intermediate network switch wherein a magnitude of the data value represents a magnitude of an operational characteristic of the first node;
    and wherein the second node determines the lower rate to send frames based on the magnitude of the data value.

2. The method of claim 1, further comprising determining the second node as the source of the received frame.

3. The method of claim 1, further comprising, at the second node:
    repeatedly increasing the lower rate to send frames to the first node after receiving the congestion notification frame.

4. A method, comprising:
    at a second node receiving a congestion notification frame from a first node via at least one intermediate network switch, the congestion notification frame comprising a first value identifying the frame as a congestion notification frame and a data value written into the congestion notification frame by the first node, the congestion notification frame being constructed by the first node in response to a buffer at the first node exceeding a threshold;
    at the second node in response to receiving the congestion notification frame, based on the data value written into the congestion notification frame by the first node, determining a lower rate to send at least one frame to the first node; and
    at the second node transmitting the at least one frame in accordance with the lower rate wherein the determining the lower rate to send frames to the node comprises a lower, non-zero rate;
    wherein the magnitude of the data value represents a magnitude of an operation characteristic of the first node; and wherein the determining at the second node lower rate to send frames comprises determining at the second node based on the magnitude of the data value.

5. The method of claim 4, further comprising:
    increasing the lower rate to send frames to the first node after receiving the congestion notification frame.

6. The method of claim 4, wherein the data value representing a magnitude of an operational characteristic of the first node comprises a throughput-capability.

* * * * *